(12) United States Patent
Tatsumi et al.

(10) Patent No.: US 6,698,140 B2
(45) Date of Patent: Mar. 2, 2004

(54) DOOR STRUCTURE FOR VEHICLE

(75) Inventors: Hisato Tatsumi, Kanagawa-ken (JP); Yasuo Otsuki, Kanagawa-ken (JP); Eiji Ono, Kanagawa-ken (JP)

(73) Assignee: Ohi Seisakusho Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/998,854

(22) Filed: Nov. 30, 2001

(65) Prior Publication Data

US 2002/0066232 A1 Jun. 6, 2002

(30) Foreign Application Priority Data

Dec. 1, 2000 (JP) ..................... P2000-366519

(51) Int. Cl.⁷ .............................. B60J 5/04
(52) U.S. Cl. ...................... 49/502; 296/146.6
(58) Field of Search ................. 49/348, 349, 352, 49/502; 296/146.5, 146.6, 146.7

(56) References Cited

U.S. PATENT DOCUMENTS

| | | | |
|---|---|---|---|
| 4,882,842 A | * 11/1989 | Basson et al. | 29/857 |
| 5,377,450 A | * 1/1995 | Varajon | 49/502 |
| 5,462,482 A | * 10/1995 | Grimes | 454/143 |
| 5,584,144 A | * 12/1996 | Hisano | 49/502 |
| 5,846,091 A | * 12/1998 | Nishijima et al. | 439/34 |
| 6,139,088 A | * 10/2000 | Okamoto et al. | 296/146.6 |
| 6,149,224 A | * 11/2000 | Tiberia et al. | 296/146.7 |
| 6,409,250 B1 | * 6/2002 | Schultheiss | 296/146.7 |

FOREIGN PATENT DOCUMENTS

| | | | |
|---|---|---|---|
| DE | 196 22 310 A1 | 5/1999 | |
| DE | 19941192 | 3/2000 | |
| EP | 0712746 | 5/1996 | |
| JP | 2000313375 | 11/2000 | |
| WO | 99/21728 | * 5/1999 | 49/502 |

* cited by examiner

*Primary Examiner*—Jerry Redman
(74) *Attorney, Agent, or Firm*—Kilpatrick Stockton LLP

(57) ABSTRACT

In a door structure for a vehicle provided with a door main body (4) having an opening (2) provided in an inner panel (3), a module base (7) in which a window regulator (6) for vertically moving a window panel (5) is assembled and a fastening portion (9a) provided near an outer periphery so as to be capable of closing the opening (2) is fixed to the inner panel (3) by a fastening member (10), and a handle (8a) provided in a room inside, the handle (8a) being fixed to the module base (7), reinforcing beads (19, 19a, 19b) are provided in the module base (7) along a line connecting a mounting portion (12) to which the handle (8a) is fixed and the fastening portion (9a) provided in a vertical direction of the mounting portion (12).

6 Claims, 4 Drawing Sheets

DOOR STRUCTURE FOR VEHICLE

BACKGROUND OF THE INVENTION

1. Field of the Invention

The present invention relates to a door structure for a vehicle of a door module type.

2. Description of the Related Art

In conventional, in a door structure for a vehicle, there has been known a door structure of a door module type structured such that an opening is provided in an inner panel of a door main body constituted by an outer panel and an inner panel, and a cable type window regulator for vertically moving a window panel (a window glass) and a module base in which the other door interior assembled parts are previously assembled, are fixed to a portion in the periphery of the opening of the inner panel by bolts so as to capable of closing the opening, thereby closing the opening by the module base (for example, refer to German Patent Application Laid-Open No. 19622310).

In the door structure for the vehicle as mentioned above, the structure is made such that a handle such as an arm rest, a grip handle or the like which is gripped at a time of opening and closing the door from a room inside is fixed to a center portion of the module base. Accordingly, since a sideward force is applied to the center portion of the module base at a time of operating the handle, it is necessary to increase a rigidity of the module base so that the module base does not deform in a door closing direction, that is, in a thickness direction.

SUMMARY OF THE INVENTION

The present invention has been made by taking the problems mentioned above in the related art into consideration, and an object of the present invention is to provide a door structure for a vehicle can effectively increase a rigidity of a portion near a mounting portion to which a handle is fixed, without increasing a thickness of a module base.

According to a first aspect of the present invention, there is provided a door structure for a vehicle comprising: a door main body having an opening provided in an inner panel; a module base provided with a window regulator for vertically moving a window panel, and having fastening portions provided in an outer peripheral of the module base and closing the opening by the module base; a mounting portion mounting a handle to an inside of the vehicle in the module base and provided between fastening portions; and reinforcing beads provided along a line connecting the mounting portion of the handle and the fastening portions.

Further, in addition, according to a second aspect of the present invention, there is provided a door structure for a vehicle as recited in the first aspect mentioned above, wherein the window regulator is a cable type winding a cable around a drive portion so as to vertically move the window panel, and the cable is arranged in parallel with a recess of the reinforcing bead.

DESCRIPTION OF THE PREFERRED EMBODIMENT

A description will be given below of an embodiment according to the present invention with reference to the accompanying drawings. In this case, in the following description, a leftward direction in FIGS. 1 and 2 is set to a "backward direction", a leftward direction in FIG. 3 is set to a "room inside" and a rightward direction is set to a "room outside".

Figure 1:
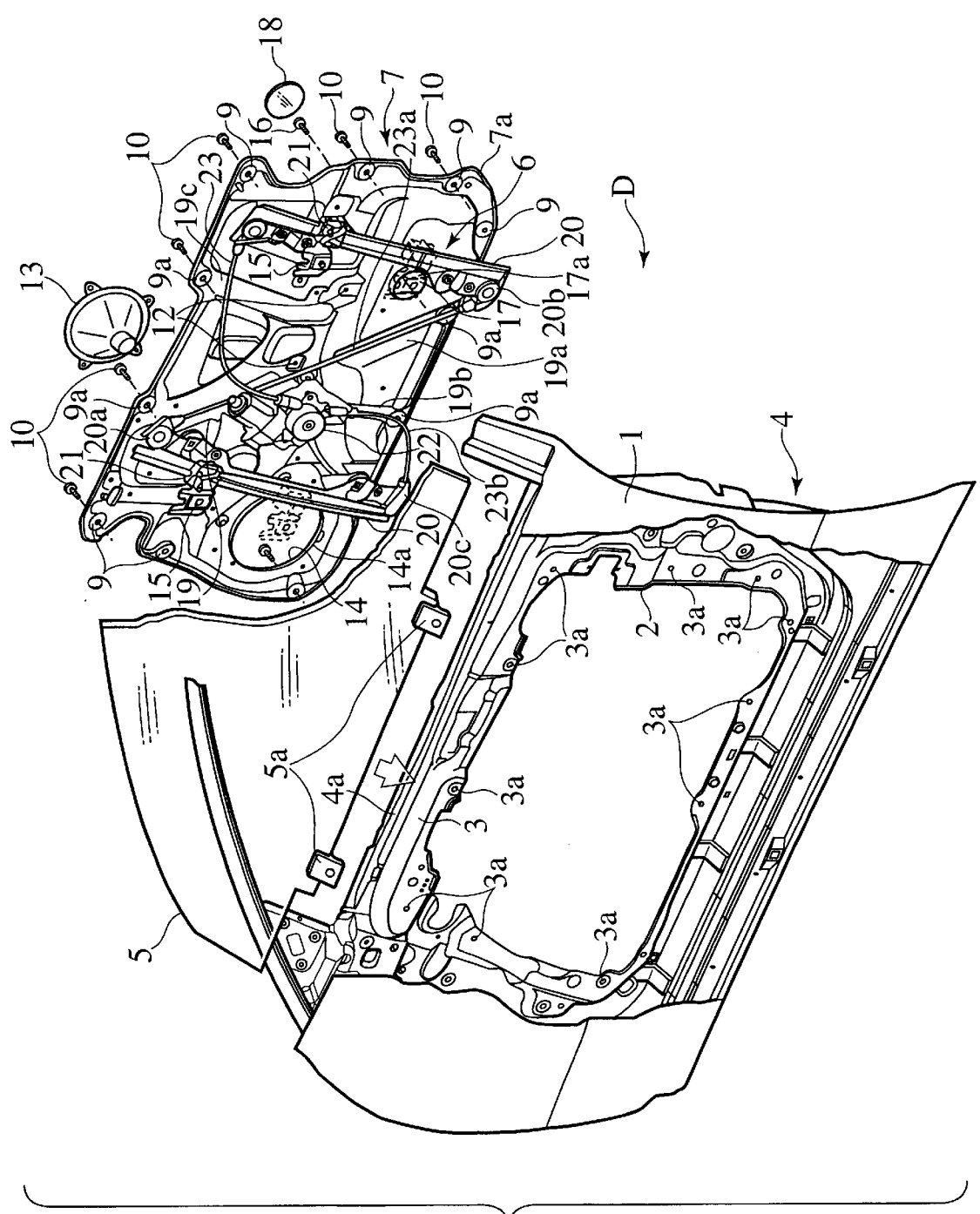
FIG. 1 is an exploded perspective view of a door showing an embodiment according to the present invention.
Figure 2:
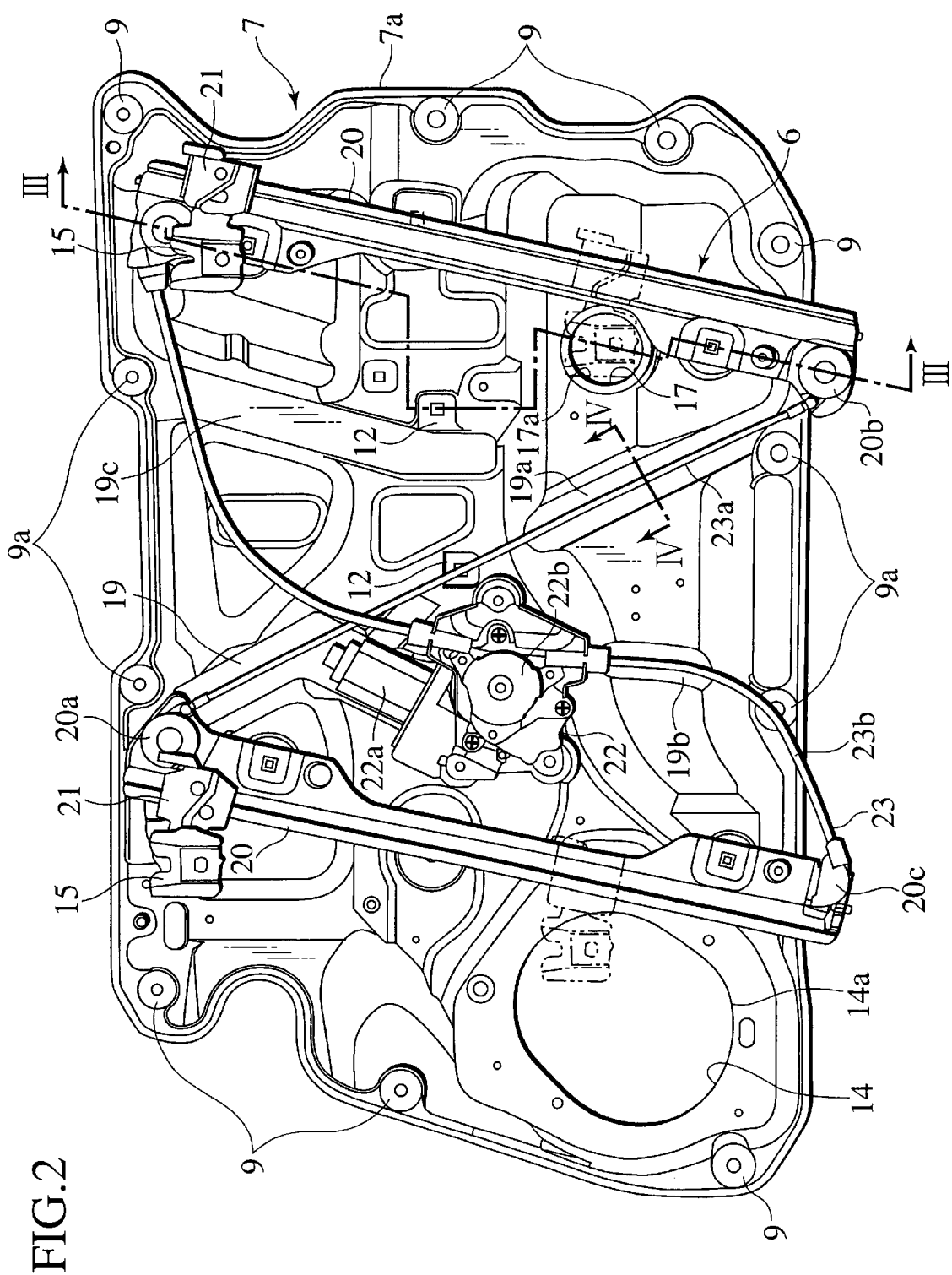
FIG. 2 is a front elevational view of a module base in the embodiment according to the present invention.
Figure 3:
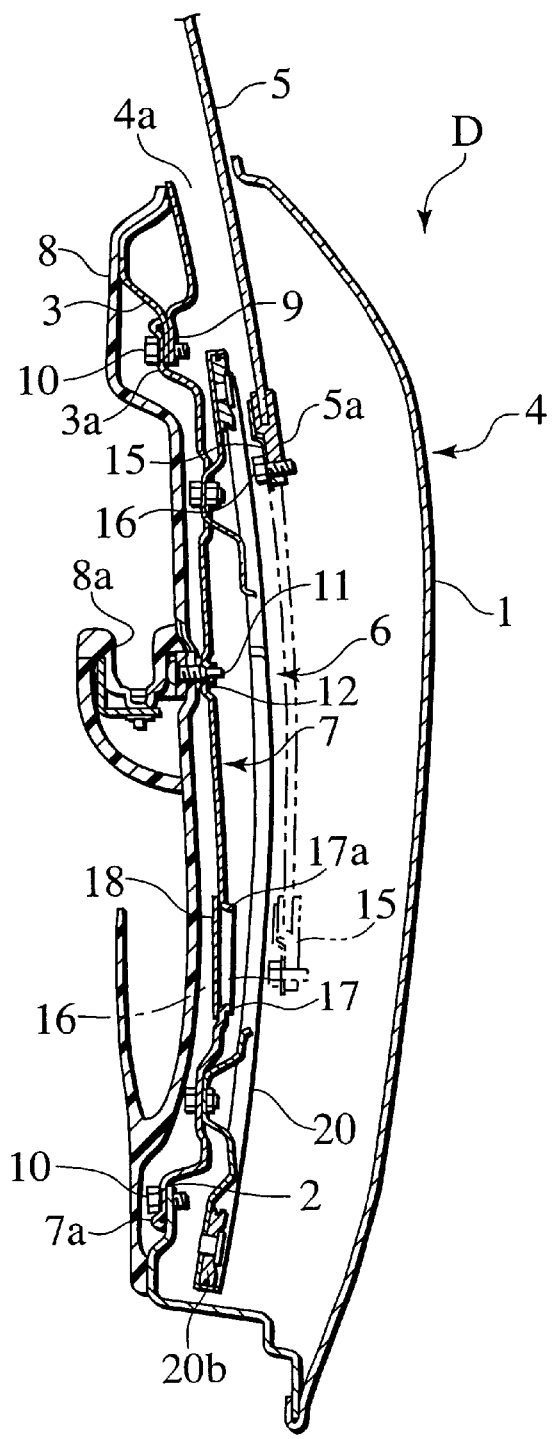
FIG. 3 is a vertical cross side sectional view of a door along a line III—III in FIG. 2, in the embodiment according to the present invention.

FIG. 1 is an exploded perspective view of a door to which the present invention is applied, FIG. 2 is a front elevational view of a module base and FIG. 3 is a vertical cross sectional view of a door.

As shown in FIGS. 1 and 3, a door D according to the present embodiment is a front door in which a front end portion is pivoted to a vehicle body by a pair of upper and lower door hinges (not shown) so as to freely open and close, and is structured such that a module base 7 in which a window regulator 6 for vertically moving a window panel (a window glass) 5 is previously assembled, and a door trim 8 covering the module base 7 are mounted to an inner panel 3 in a door main body 4 formed by hemming or spot welding a peripheral edge of an outer panel 1 made of a steel sheet and the inner panel 3 made of a steel sheet and having an opening 2 in a center portion thereof.

The module base 7 is formed by drawing the steel sheet by a press molding machine and is structured such that a plurality of fastening portions 9 and 9a provided along an outer peripheral edge of the module base 7 are fastened to a fixed portion 3a provided in the periphery of the opening 2 of the inner panel 3 by means of a bolt 10. Accordingly, the module base 7 is fixed to the inner panel 3 and closes the opening 2. The window regulator 6 is arranged in an inner portion of the door main body 4 via the opening 2.

Front and rear mounting portions 12 which are provided in a side of a door trim 8 and into which a bolt 11 for fixing an arm rest gripped at a time of opening and closing the door D from the room inside or a handle 8a such as a grip handle or the like is screwed are provided substantially a center portion of the module base 7.

A mounting hole 14 to which a speaker 13 corresponding to a door interior assembled part is mounted is provided in a forward lower portion of the module base 7, and a working hole 17 for working is provided in a backward lower portion thereof, respectively. A seal member 7a securing a water tightness and a sound insulating property between the inner panel 3 and the module base 7 is adhered to all the periphery of the module base 7.

The working hole 17 is utilized for confirming a fastening operation and a fastened position of a bolt 16 fastening a rear holder 5a adhered to a lower end portion of the window panel 5 to a clamp 15 mentioned below in the window regulator 6.

Reference numeral 18 denotes a synthetic leather lid closing the working hole 17 so as to secure water tightness. An outer periphery of the lid 18 is bonded to a periphery of the working hole 17 by an adhesive, a double-stick tape or the like. The mounting hole 14 is closed by the speaker 13.

Figure 5:
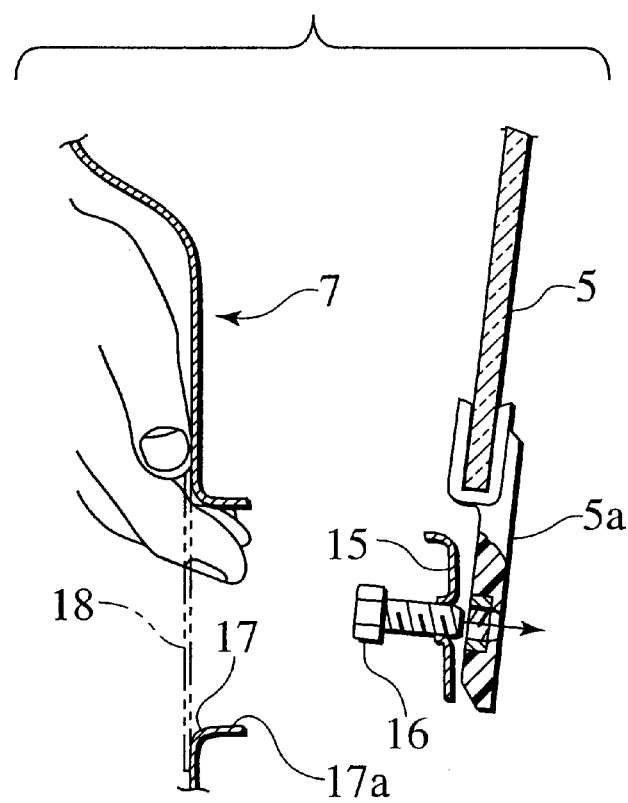
FIG. 5 is an enlarged vertical cross sectional view of a main portion, in the embodiment according to the present invention.

A flange 17a protruding toward the room outside (an inner portion of the door) in a tubular manner according to a press burring process is formed in an inner peripheral edge of the working hole 17, as shown in FIG. 5. Further, the same flange 14a is also formed in an inner peripheral edge of the mounting hole 14.

The flanges 14a and 17a improve a strength and a rigidity in the periphery of the mounting hole 14 and the working hole 17 in the module base 7, and are used as a portion with which a finger is engaged at a time of conveying the module base 7.

Reinforcing beads 19, 19a, 19b and 19c in a vertical direction protruding to the room inside are provided on a line connecting the mounting portion 12 in the module base 7 and the fastening portions 9a disposed in the upper and lower portions thereof.

The reinforcing beads 19, 19a, 19b and 19c increase a strength and a rigidity in the vertical direction of the module base 7, particularly, between the mounting portion 12 and the respective upper and lower fastening portions 9a, and restrict an amount of displacement in a thickness direction of the module base 7. Accordingly, since a load input to the module base 7 from the handle 8a at a time of closing the door D is substantially uniformly dispersed to the respective upper and lower fastening portions 9a via the respective reinforcing beads 19, 19a, 19b and 19c, a rigid feeling of the module base 7 can be increased, and an improved door closing operation can be obtained. Further, it is possible to reduce a thickness of the module base, and it is possible to lighten the door and reduce a cost.

The window regulator 6 is a cable type window regulator, and is formed by a pair of front and rear guide rails 20 fixed to the module base 7 so as to move along a vertically moving track of the window panel 5, front and rear carrier plates 21 fitted to the front and rear guide rails 20 so as to be capable of sliding in a vertical direction, a drive portion 22 attached to a substantially center of the module base 7, and a cable 23 wound up around a drum 22b rotated by a motor 22a in the drive portion 22 so as to be wound so as to be capable of feeding out, arranged between the front and rear guide rails 20 in a cross multiplication shape and connected to the front and rear carrier plates 21.

The clamp 15 is extended forward in the front and rear carrier plates 21 so as to be capable of vertically moving along side portions of the front and rear guide rails 20.

The cable 23 comprises two parts denoted as 23a, 23b. The cable 23a disposed between a guide portion 20a provided in an upper end portion of the front guide rail 20 and a guide portion 20b provided in a lower end portion of the rear guide rail 20 is guided along a recess of the reinforcing beads 19 and 19a. Further, in the same manner, the cable 23b disposed between a guide portion 20c provided in a lower end portion of the front guide rail 20 and the drive portion 22 is guided along a recess of the reinforcing bead 19b.

An extended portion 23a of the cable 23 disposed between a guide portion 20a provided in an upper end portion of the front guide rail 20 and a guide portion 20b provided in a lower end portion of the rear guide rail 20 is guided along a recess of the reinforcing beads 19 and 19a. Further, in the same manner, an extended portion 23b of the cable 23 disposed between a guide portion 20c provided in a lower end portion of the front guide rail 20 and the drive portion 22 is guided along a recess of the reinforcing bead 19b.

Figure 4:
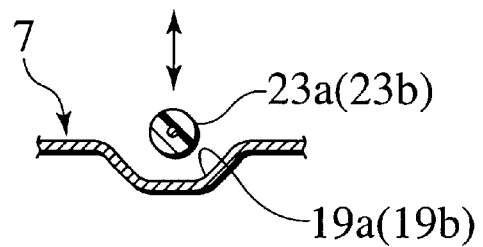
FIG. 4 is a horizontal cross sectional view along a line IV—IV in FIG. 2, in the embodiment according to the present invention.

Accordingly, a sufficient gap (space portion) is secured in room inside and outside directions, as shown in FIG. 4, between the extended portions 23a and 23b of the cable 23 and the reinforcing beads 19, 19a and 19b, so that even when the extended portions 23a and 23b of the cable 23 oscillate in the room inside and outside directions due to an inertial force of a closing operation of the door D, the module 7 is neither brought into contact with the base 7 nor a slapping sound is generated.

When the front and rear carrier plates 21 are at predetermined positions as shown by imaginary lines in FIGS. 1 to 3, the front clamp 15 and the rear clamp 15 respectively overlap the mounting hole 14 and the working hole 17, whereby it is possible to confirm the positions of the front and rear clamps 15 from the mounting hole 14 and the working hole 17. That is, the mounting hole is provided on a moving path of the front clamp 15, and the working hole 17 is provided on a moving path of the rear claim 15.

The window panel 5 is inserted to an inner portion of the door main body from a waist opening 4a of the door main body 4 after fixing the module base 7 to the inner panel 3, and bolts 16 are inserted to the inner portion of the door main body 4 from the mounting hole 14 and the working hole 17 by using a tool in a state of aligning the positions of the front and rear holders 5a and the clamp 15, whereby the holders 5a and the clamp 15 are fastened by the bolts 16. Accordingly, the window panel 5 is connected to the carrier plate 21 of the window regulator 6.

After the fastening operation between the holders 5a of the window panel 5 and the clamp 15, the working hole 17 is closed by the lid 18, and the mounting hole 14 is closed by the speaker 13.

What is claimed is:

1. A door structure for a vehicle, the door structure comprising:

a door main body having an opening provided in an inner panel;

a module base provided with a window regulator for vertically moving a window panel, and having fastening portions provided in opposite sides of an outer peripheral of the module base and securing the module base to the inner panel so that the module base closes the opening in the inner panel;

a mounting portion provided on the module base between the fastening portions and mounting a handle to an inside of the door structure; and at least one reinforcing bead provided on the module base along a linear line substantially connecting the mounting portion of the handle and the fastening portions, so that a load applied to the module base from the handle mounting portion at a time of closing the door is substantially uniformly dispersed to the respective mounting portions by the reinforcing bead.

2. The door structure for a vehicle of claim 1, wherein the window regulator is a cable type winding a cable around a drive portion so as to vertically move the window panel, and the cable is arranged in parallel with a recess of the reinforcing bead.

3. The door structure for a vehicle of claim 2, wherein the window regulator further comprises:

a pair of front and rear guide rails fixed to the module base; and carrier plates fitted to the front and rear guide rails so as to freely slide in a vertical direction, wherein the cable crosses between the guide rails.

4. The door structure for a vehicle of claim 3, wherein the carrier plates further comprise a pair of clamps extended forward so as to freely move along a side portion of the guide rail vertically, and wherein a mounting hole is provided on a moving path of a front clamp of the clamps, and a working hole is provided on a moving path of a rear clamp of the clamps.

5. The door structure for a vehicle of claim 4, further comprising flanges protruding toward an outside of the vehicle in a tubular shape which are respectively provided in an inner peripheral of the working hole and the mounting hole.

6. The door structure for a vehicle of claim 2, wherein a space is provided between the reinforcing bead and the cable.

* * * * *